United States Patent
Katchmart

(10) Patent No.: US 8,711,507 B1
(45) Date of Patent: Apr. 29, 2014

(54) GATE TIMING FOR SHORT SERVO WEDGE IN DISK MEMORY SYSTEMS

(75) Inventor: Supaket Katchmart, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 37 days.

(21) Appl. No.: 13/608,225

(22) Filed: Sep. 10, 2012

Related U.S. Application Data

(60) Provisional application No. 61/534,693, filed on Sep. 14, 2011.

(51) Int. Cl.
  *G11B 5/09* (2006.01)
  *G11B 5/596* (2006.01)
(52) U.S. Cl.
  USPC .......................................... 360/51; 360/77.08
(58) Field of Classification Search
  None
  See application file for complete search history.

(56) References Cited

U.S. PATENT DOCUMENTS

| | | | | |
|---|---|---|---|---|
| 7,046,465 B1* | 5/2006 | Kupferman | ..................... | 360/48 |
| 8,295,002 B1* | 10/2012 | Katchmart | ..................... | 360/48 |
| 8,462,454 B1* | 6/2013 | Katchmart | ..................... | 360/48 |
| 8,477,444 B1* | 7/2013 | Zou et al. | ........................ | 360/51 |
| 8,508,879 B1* | 8/2013 | Zou et al. | ........................ | 360/51 |

* cited by examiner

*Primary Examiner* — Regina N Holder

(57) ABSTRACT

The present disclosure describes systems and methods for controlling synchronization of a servo clock by tying the triggering of the gate signal of the position error signal field of the short servo wedge portion directly to the synchronization marker in the full servo wedge. The systems and methods described herein include controlling synchronization of a servo clock for reading servo information from a disk that is rotating relative to a read head. The systems and methods may include estimating a gate delay corresponding to a position error signal (PES) field in a short null servo wedge based, at least in part, on the location of the servo synchronization marker. The systems and methods include producing a servo clock timing control signal based on the estimated gate delay, and applying the servo clock timing control signal to the servo clock.

20 Claims, 6 Drawing Sheets

GATE TIMING FOR SHORT SERVO WEDGE IN DISK MEMORY SYSTEMS

This application claims the benefit of U.S. provisional application No. 61/534,693, filed on Sep. 14, 2011, which is hereby incorporated by reference herein in their entirety.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted as prior art against the present disclosure.

The present disclosure relates to disk memory systems. Disk memory systems typically contain a disk on which information (usually in the form of digital data) can be recorded (written) and/or from which recorded information can be retrieved (read).

In systems of a type mentioned above, the information is generally recorded in a plurality of concentric circular paths or tracks on the disk. The "head" that writes data to and/or reads data from the disk must follow particular ones of these tracks in order to write data to or read data from the disk.

In order to read desired information from the disk, the read head must be properly located "over" a track containing that desired information. To facilitate such read head positioning, the disk is also recorded with several radially extending and angularly spaced "wedges" of information that contain track-identifying information, and also information that can be used to control a read-head-positioning mechanism to optimally center the read head over a desired track, especially in a direction that is radial of the disk.

Only some of the above-mentioned wedges may be so-called "full servo wedges." A full servo wedge includes a full complement of information such as track and sector identifying information for each track, as well as so-called "servo" information for helping the read-head-positioning mechanism to radially position the head over the desired track. Such full servo wedges may be angularly interspersed (or inter-digitated) with so-called "short servo wedges." A short servo wedge may contain only servo information for helping to ensure that the read head remains radially centered over the track it is already currently reading data from.

The present disclosure relates to improving the performance of disk memory systems that employ short servo wedges.

SUMMARY

The present disclosure describes systems and methods for controlling synchronization of a servo clock by tying the triggering of the gate signal of the position error signal field of the short servo wedge portion directly to the synchronization marker in the full servo wedge.

In certain aspects, the systems and methods described herein include methods of controlling synchronization of a servo clock for reading servo information from a disk that is rotating relative to a read head. The methods may include determining a location of a servo synchronization marker on a full null servo wedge, and estimating a gate delay corresponding to a position error signal (PES) field in a short null servo wedge based, at least in part, on the location of the servo synchronization marker. The methods may include producing a servo clock timing control signal based on the estimated gate delay, and applying the servo clock timing control signal to the servo clock.

In certain embodiments, the gate delay is a first gate delay, and further comprising estimating a second gate delay corresponding to a PES field in an additional short null servo wedge based, at least in part, on the estimated first gate delay, and producing the servo clock timing control signal based on the estimated first gate delay and the estimated second gate delay. In such embodiments, estimating the second gate delay includes determining a number of system clock cycles between the short null servo wedge and the additional short null servo wedge. The PES field of the short servo wedge and servo synchronization marker of the full servo wedge may be formed on the same track.

In certain embodiments, methods include estimating the gate signal corresponding to the PES field based, at least in part, on at least one of a servo gate signal, a leading edge of the servo synchronization marker, a trailing edge of the servo synchronization marker, and a middle portion of the servo synchronization marker. The methods may include estimating the gate signal includes estimating at least one of a leading edge of the first gate signal, a trailing edge of the first gate signal, and a middle portion of the first gate signal.

In certain embodiments, estimating the gate delay corresponding to the PES field in the short null servo wedge includes determining a time period delay from the servo synchronization marker. Estimating the gate delay may correspond to the PES field in the short null servo wedge includes determining an integer number of cycles from the servo synchronization marker. In certain embodiments, the integer number of cycles includes a predetermined number of cycles. The integer number of cycles may include a variable number of cycles.

In certain aspects, the systems and methods described herein may include synchronization circuitry. The synchronization circuitry may include circuitry for determining a location of a servo synchronization marker on a full null servo wedge, and estimating a first gate delay corresponding to a position error signal (PES) field in a short null servo wedge based, at least in part, on a location of the servo synchronization marker. The synchronization circuitry may include servo timing circuitry coupled to the processor and configured for producing a servo clock timing control signal based on an estimated gate delay and applying the servo clock timing control signal to a servo clock.

Further features of the disclosure, its nature and various advantages will be more apparent from the accompanying drawings and the following detailed description.

DETAILED DESCRIPTION

To simplify the further discussion herein, it will generally be assumed that the disk is already recorded with information and that the above-mentioned head is a "read head" via which information is read from the disk. It will be understood, however, that this disclosure is also applicable to writing information to a disk, and that the head can include write as well as read capabilities. Another assumption that will generally be made to simplify the following discussion is that the disk is a magnetic disk that records information based on how various regions (areas) of the disk are magnetically polarized. Again, however, it will be understood that the disk can alternatively record information in other ways such as by optically detectable means.

Figure 1:
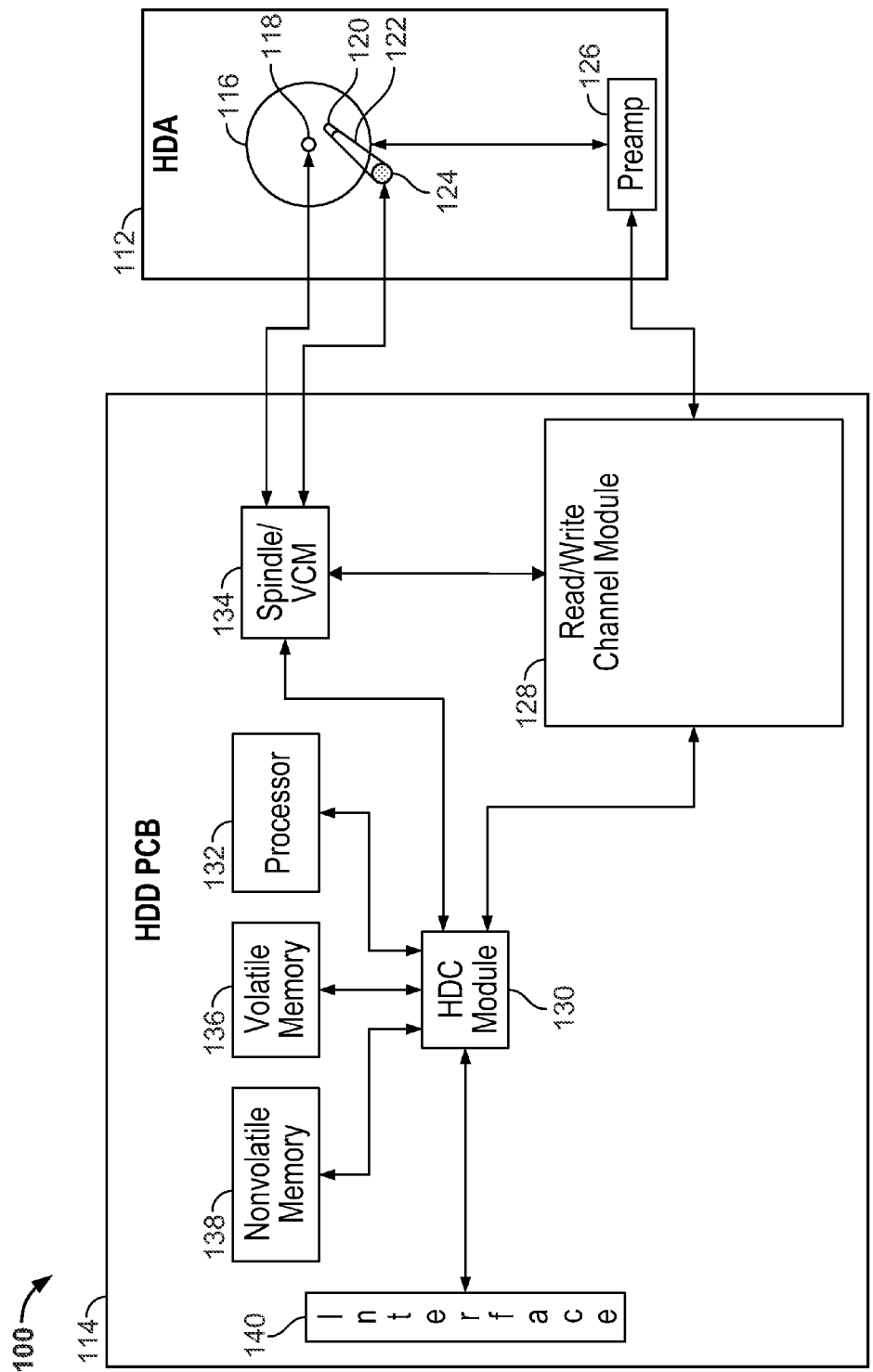
FIG. 1 illustrates a hard disk drive (HDD) system in accordance with an embodiment of the present disclosure.

FIG. 1 illustrates a HDD system 100 in accordance with an embodiment of the present disclosure. The HDD system 100 includes a hard disk assembly (HDA) 112 and a HDD printed circuit board (PCB) 114. The HDA 112 includes one or more circular platters (i.e. disks) 116, which have magnetic surfaces that are used to store data magnetically. The disks 116 are arranged in a stack, and the stack is rotated by a spindle meter 118. At least one read and write head (hereinafter, "head") 120 reads data from and writes data on the magnetic surfaces of the disks 116.

The head 120 includes a write element, such as an inductor, that generates a magnetic field and a read element, such as a magneto-resistive (MR) element, that senses a magnetic field on the disks 116. The head 120 is mounted at a distal end of an actuator arm 122. An actuator, such as a voice coil motor (VCM) 124, moves the actuator arm 122 relative to the disks 116.

The HDA 112 includes a preamplifier device 126 that amplifies signals received from and sent to the head 120. The preamplifier device 126 generates a write current that flows through the write element of the head 120 when writing data. The write current is used to produce a magnetic field on the magnetic surfaces of the disks 116. Magnetic surfaces of the disks 116 induce low-level analog signals in the read element of the head 120 during reading of the disks 116. The preamplifier device 126 amplifies the low-level analog signals and outputs amplified analog signals to a read/write channel module 128.

The HDD PCB 114 includes the read/write channel module 128, a hard disk controller (HDC) 130, a processor 132, a spindle/VCM driver module 134, volatile memory 136, non-volatile memory 138, and an input/output (I/O) interface 140.

During write operations, the read/write channel module 128 may encode the data to increase reliability by using error-correcting codes (ECC) such as run length limited (RLL) code, Reed-Solomon code, etc. The read/write channel module 128 then transmits the encoded data to the preamplifier device 126. During read operations, the read/write channel module 128 receives analog signals from the preamplifier device 126. The read/write channel module 128 converts the analog signals into digital signals, which are decoded to recover the original data.

The HDC module 130 controls operation of the HDD system 100. For example, the HDC module 130 generates commands that control the speed of the spindle motor 118 and the movement of the actuator arm 122. The spindle/VCM driver module 134 implements the commands and generates control signals that control the speed of the spindle motor 118 and the positioning of the actuator arm 122. Additionally, the HDC module 130 communicates with an external device (not shown), such as a host adapter within a host device, via the I/O interface 140. The HDC module 130 may receive data to be stored from the external device, and may transmit retrieved data to the external device.

The processor 132 processes data, including encoding, decoding, filtering, and/or formatting. Additionally, the processor 132 processes servo or positioning information to position the head 120 over the disks 116 during read/write operations. Servo information, which is stored on the disks 116, ensures that data is written to and read from correct locations on the disks 116.

System 100 may include a crystal oscillator that generates a precise electrical oscillatory signal from which other clock signals used by the system 100. The crystal oscillator may be included in the read/write channel module 128. In certain implementations, the crystal oscillator may be a quartz-based crystal operating at or around a frequency of 20 MHz. More generally, the read/write channel module may include a write clock synchronization module, which synchronizes write clock signals with synchronization markers in servo sector regions of the disks 116 and/or synchronizes write clock signals with discontinuous bit islands on the disks 116. The system 100 and more specifically, the write clock synchronization system, estimates phases of servo clock signals and write clock signals ascertain times. The synchronization module may include additional architecture configured to read, write, and servo clocks.

The system 100 may further include a servo VCO that derives a base servo clock signal from the crystal oscillator, and a data VCO that derives a data clock signal from the crystal oscillator. Each of the servo VCO and the data VCO may use a phase-locked loop or similar circuitry to achieve synchronization with the crystal oscillator. In addition, each of the servo VCO and data VCO may adjust for frequency errors, e.g., frequency "jitter."

Figure 2:
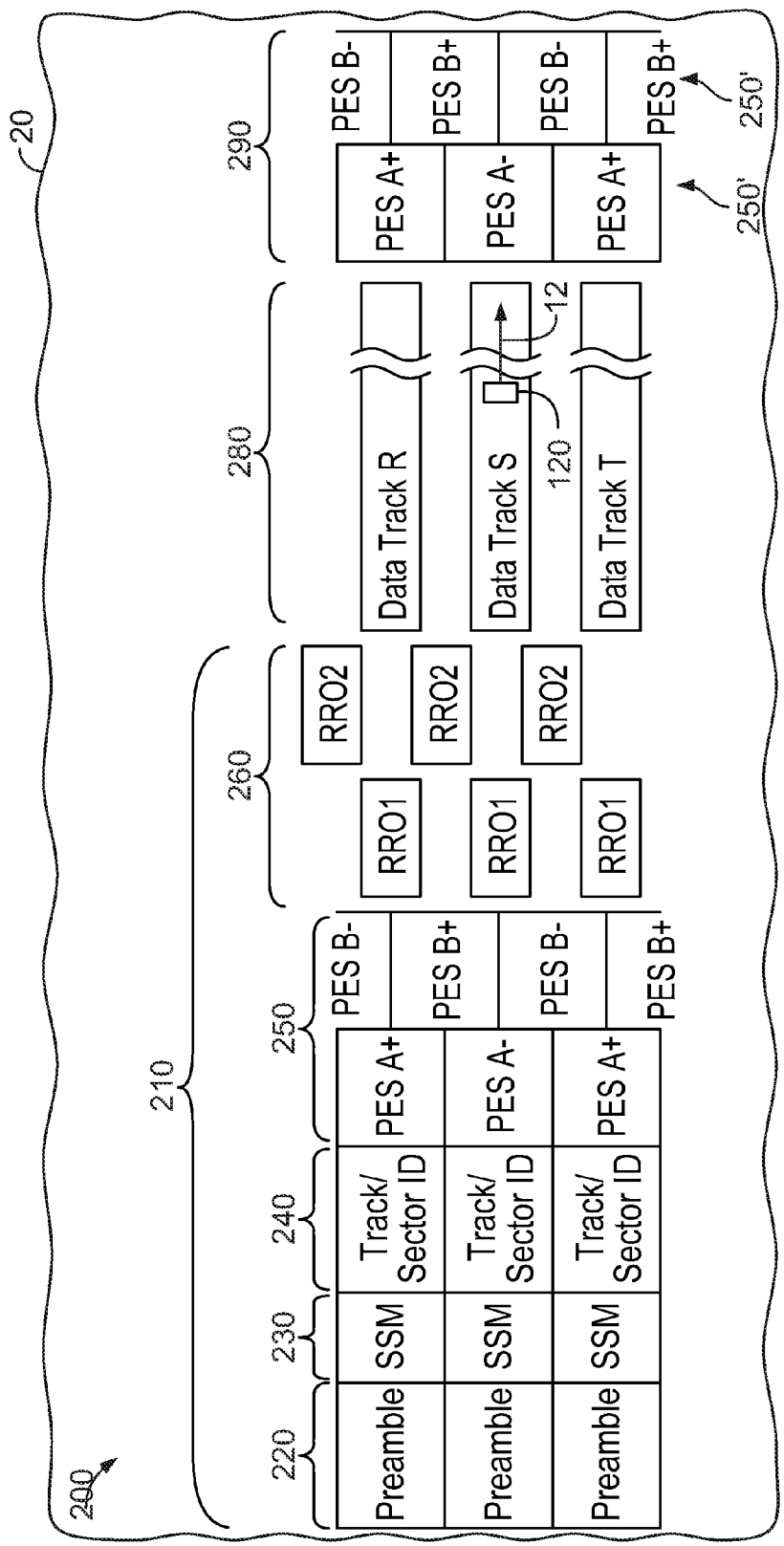
FIG. 2 is a simplified representation (plan view) of a representative portion of a known arrangement of information recording on a memory disk.

As noted earlier, the HDD may include disk positioned on holder or stack 116. The memory disk may be configured with information arranged so that it can be read by the HDD. FIG. 1 shows a representative portion of a known arrangement 100 of information recorded on a memory disk 20 in a disk memory system 100. Only a representative portion of disk 20 is shown in FIG. 2. This arrangement (and other arrangements that are shown herein) would in reality actually be somewhat arcuate (e.g., concave up or concave down as viewed in FIG. 2) because the "tracks" shown are radially adjacent segments of longer, concentric circular tracks on the disk. The actual, somewhat arcuate shape of recorded information arrangement 200 has been made straight (i.e., from left to right across FIG. 2) to simplify the depiction and the following discussion. Directions that are radial of disk 20 are vertical as viewed in FIG. 2. Planar rotation of disk 20 causes information 100 to move from right to left (which is the circumferential or angular direction of disk 20). Read head 120 (which is part of the disk memory system 100 containing disk 20) is able to move in a direction that is radial of disk 20 (i.e., up or down in FIG. 2), but can be assumed for present purposes not to move in directions that are circumferential or angular of disk 20. A servo mechanism (shown in FIG. 1) controls the radial position of read head 10, based at least in part on information read from disk 20. The recorded information arrangement 200 shown in FIG. 2 has the so-called "null servo position error signal format." ("Position error signal" is frequently abbreviated "PES.") Other formats for information on disks in disk memory systems are also known, but the present disclosure is especially useful in connection with the null servo PES format.

FIG. 2 shows portions of three, representative, radially adjacent recorded information tracks on disk 20. These tracks are arbitrarily referenced R, S, and T, respectively. FIG. 2 shows read head 120 positioned over track S and therefore reading information along the axis indicated by arrow 12 as that information moves from right to left under read head 120. (Note again that arrow 12 in FIG. 2 does not indicate motion of read head 120, but rather the direction of information reading as rotating disk 20 travels under read head 120.)

FIG. 2 also shows the information in a representative portion of one full null servo PES wedge 210 and a representative portion of one short null servo PES wedge 290. Data tracks R, S, and T are in a data wedge 280 between full null servo PES wedge 210 and short null servo PES wedge 290. This pattern may continue in a closed loop series all the way around disk 20. For example, this closed loop series may comprise a first full null servo PES wedge, a first data wedge, a first null short PES servo wedge, a second data wedge, a second full null servo PES wedge, a third data wedge, a second short null servo PES wedge, a fourth data wedge, and then back to the first full null servo PES wedge. Alternatively, a pattern like the one just described may be longer before it gets back to the first full null servo PES wedge. As still another alternative, a pattern like the one described may have more than one short null servo PES wedge, each of which is followed by a data wedge, before the next full null servo PES wedge is encountered.

FIG. 2 shows that each full null servo PES wedge 210 may include (in the order read by read head 120) a preamble area 220, a servo sync mark ("SSM") area 230, a track/sector identification ("ID") area 240, a PES area 250, and a repeatable run-out ("RRO") area 260. SSM area 230 and PES area 250 are of special importance for present purposes and will be described in more detail below. FIG. 2 further shows that each short null servo PES wedge 290 includes a PES area 250 similar to PES area 250.

Figure 3:
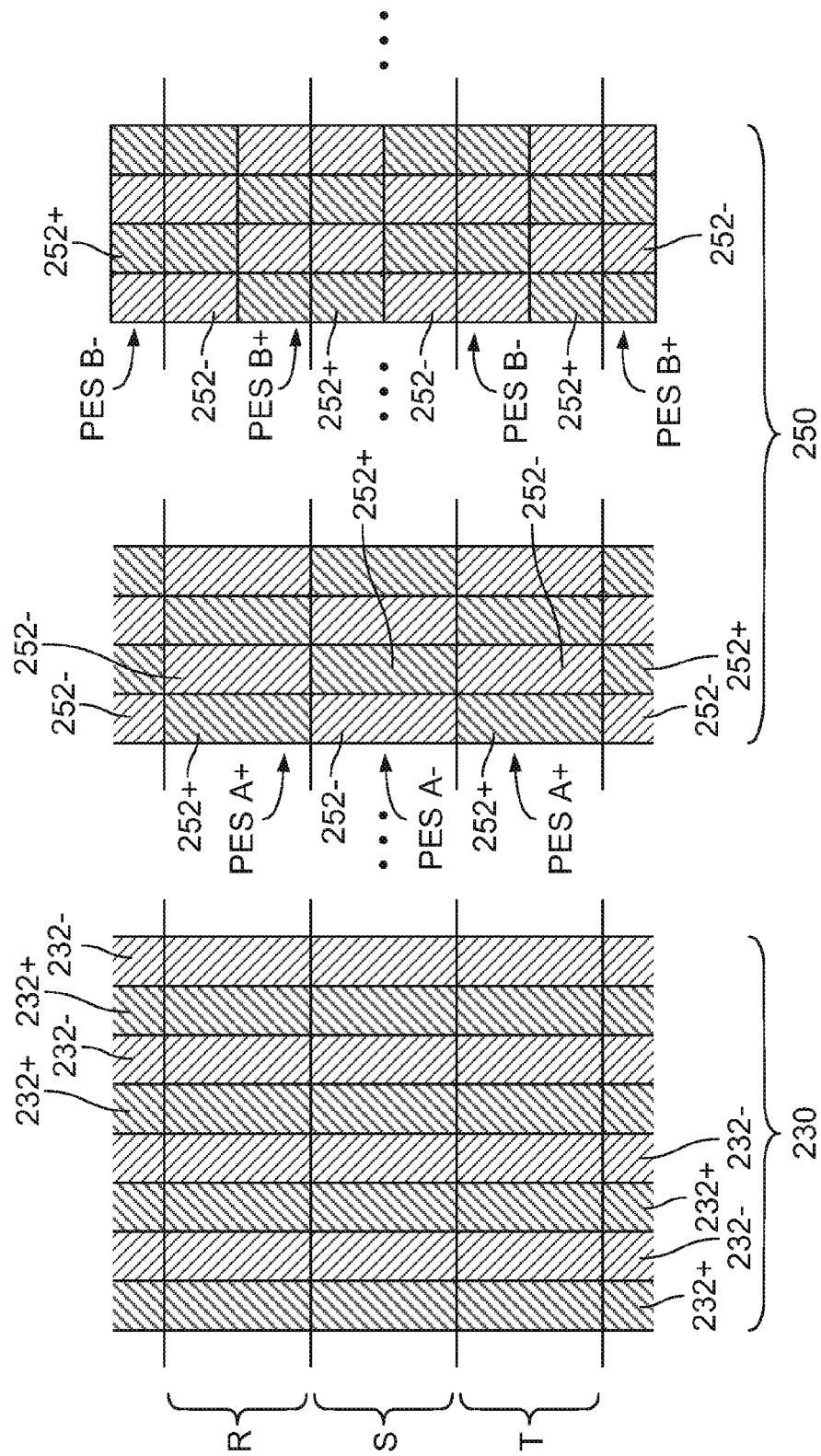
FIG. 3 is a more detailed, but still simplified diagram of representative portions of the FIG. 2 recorded information arrangement.

SSM area 230 may include bands of disk 20 material having alternating magnetic polarity that extend radially off the disk, continuously across all of the tracks on the disk. FIG. 3 includes a depiction of a representative portion of such an SSM area 230. Thus, as shown in FIG. 3, each band 232+ extends radially across all of tracks R, S, T, etc., and has "positive" magnetic polarity. Interspersed or inter-digitated between bands 232+ are bands 232−, which are similar to bands 232+ but which have magnetic polarity (e.g., "negative" magnetic polarity) that is opposite to the magnetic polarity of bands 232+. As read head 120 passes over successive bands 232 of SSM area 230, the output signal of read head 120 fluctuates in response to the different polarities of the successive bands 232. The phase of this fluctuating read head 120 output signal is used to determine the phase (or angular position) of SSM area 230 on disk 20. Because it is known where SSM area 230 was recorded on disk 20, this also provides a determination of the angular position of disk 20. Note that because bands 232 are radially continuous across all of tracks R, S, T, etc., this angular position (synchronization or "sync") information can be determined identically regardless of how well read head 120 is currently aligned in the radial direction with any particular track.

Once the phase angle of SSM area 230 has been determined as described above, the PES area 250 that is part of the same full null servo PES wedge 210 can be used to provide information for ensuring that read head 120 is centered (in the radial direction) over a particular track like any of tracks R, S, T, etc. FIG. 3 shows that in PES area 250 a PES A+ subarea is aligned with track R, a PES A− subarea is aligned with track S, and a PES A+ subarea is aligned with track T. This pattern of alternating PES A+ and PES A− subareas continues for tracks above and below representative tracks R, S, and T.

Downstream from the PES A area, PES area 250 includes a PES B+ subarea that straddles (i.e., is equally distributed across) radially adjacent, radial halves of each of tracks R and S. A PES B− subarea similarly straddles tracks S and T. Another PES B+ subarea similarly straddles track T and the next track down. This pattern of alternating PES B+ and PES B− subareas continues above and below what is representatively depicted in FIG. 2.

FIG. 3 also shows a pattern of information that may be recorded on the disk in PES area 250. For example, a PES A+ subarea may begin (on the left) with a band 252+ having positive magnetic polarity, followed by a band 252− of negative magnetic polarity, which is followed in turn by another band 252+ having positive magnetic polarity, and so on. On the other hand, a PES A− subarea may start (on the left) with a band 252− of negative magnetic polarity, followed by positive polarity band 252+, then a negative polarity band 252−, and so on. A PES B+ subarea may be similar to a PES A+ subarea, except, of course, that it exactly straddles two radially adjacent tracks. A PES B− subarea may be similar to a PES A− subarea, except that it exactly straddles two radially adjacent tracks.

If read head 120 is exactly centered (in the radial direction) over a track, the signal from read head 120 as it passes over the PES A region of full null servo PES wedge 210 will be a fluctuating signal of maximum strength (amplitude) corresponding to either the PES A+ or the PES A− pattern, depending on whether the track being read is aligned with a PES A+ or a PES A− subarea. After passing over the PES A area, a read head 10 that is exactly centered over a track as mentioned in the preceding sentence will produce an output signal having essentially zero amplitude as it passes over the PBS B area. This is so because in the PBS B area, the read head 120 in this situation is always exactly straddling 252+ and 252− subareas. The effects of such exactly straddled subareas 252+ and 252− on read head 120 substantially cancel one another.

If instead of being radially centered over a track as read head 120 passes over the PBS A and PES B areas, read head 120 is somewhat radially offset from the center of a track, the amplitude of the read head 120 output signal will be correspondingly diminished as it passes over the PES A area. This read head 120 output signal amplitude reduction or attenuation will be due to some contribution from each of two radially adjacent PES A areas, one of which will be a PES A+ subarea and the other of which will be a PES A− subarea. The amount of this read head 120 output signal amplitude reduction or attenuation can be used as a measure of how far from the center of a track read head 120 is. Such a non-centered read head 120 will also have an output signal of non-zero amplitude as it continues over the PES B area of full null servo PES wedge 210. This non-zero amplitude will be due to the fact that read head 120 no longer exactly straddles radially adjacent PES B+ and PES B− subareas, but rather is being more strongly influenced by one or the other of such subareas. A phase of this non-zero amplitude read head 120 output signal (relative to the phase of the immediately preceding SSM area 230) can be used to indicate whether read head 120 needs to be moved radially in or radially out in order to become radially centered over the track it is trying to read. For example, the phase of the above-mentioned non-zero amplitude signal (relative to the SSM area 230 phase) may be 0° if a PES B+ subarea is a predominant influence on read head 120. Alternatively, the phase of the above-mentioned non-zero amplitude signal (relative to the SSM area 230 phase) may be 180° if a PES B−0 subarea is the predominant influence on read head 120. Of course, these are only examples, and the phase relationship between the SSM and PES B areas depends on such factors as the angular spacing between these areas, the patterns in which information is recorded in these areas, etc.

Thus, to briefly summarize the foregoing discussion, the information gathered from a read head 120 passing over a full null servo PES wedge 210 can be used to determine whether read head 120 is properly centered over the track it is trying to read (PES A area read head 120 output signal at full amplitude and PES B area read head 120 output signal at or near zero amplitude), or is in need of some radial adjustment in order to become radially centered over the track. In the latter case (i.e., radial adjustment of read head 120 needed), the amount of that radial adjustment can be derived from the amount by which the PES A read head 120 output signal amplitude is reduced from full amplitude; and the direction of the needed radial adjustment can be derived from the phase of the PES B output signal (relative to the phase of the read head 120 output signal in the immediately preceding SSM area 230).

The foregoing operations are highly effective within a full null servo PES wedge like 210. As mentioned earlier in this disclosure, however, to conserve space on a disk, short null servo PES wedges like 290 may be interspersed with full null servo PES wedges like 210. The recorded information in each known short null servo PES wedge 290 may be another instance 250' of what is shown at 250 in FIGS. 2 and 3. In particular, each known short null servo PES wedge 290 typically includes only PES A and PES B areas, and does not include other information such as is shown in areas 220, 230, 240, and 260 in FIG. 2 or in area 230 in FIG. 3.

As noted earlier, the HDD system 100 generally works under the watch of clocks. The HDD system reads every servo sector on a servo track even whether it needs to read or write data. The system 100 separates servo sectors reading and data sectors reading. Servo sectors are typically read by servo processors and a special signal—servo gate signal—tells servo processor when to read next servo sector.

Figure 4:
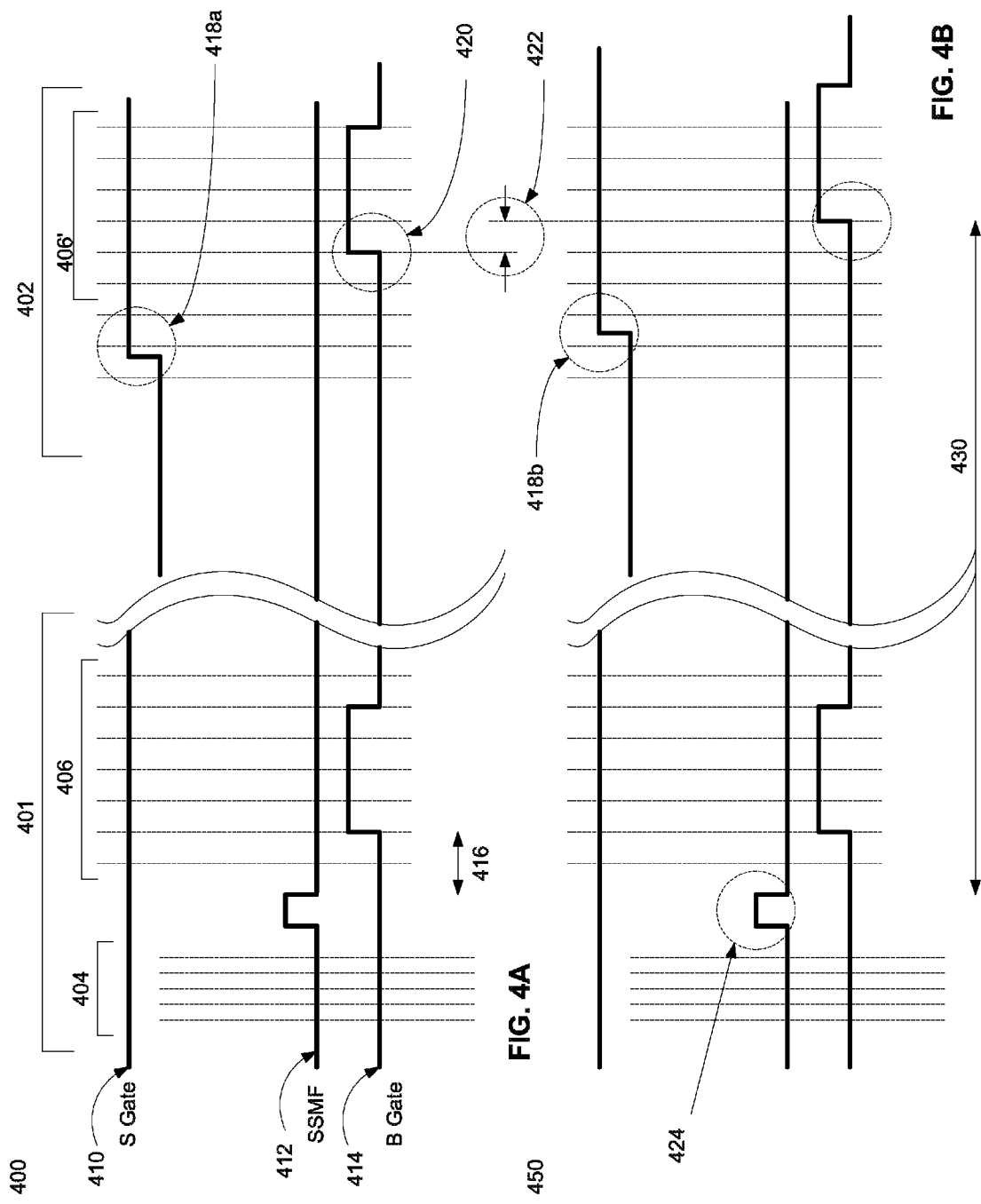
FIGS. 4A and 4B illustrate a synchronization protocol and synchronization parameters used by the HDD in accordance with an embodiment of the present disclosure.

FIGS. 4A and 4b illustrate a synchronization protocol and synchronization parameters used by the HDD system 100 to synchronize short servo wedge gates in accordance with an embodiment of the present disclosure. In particular, FIG. 4A shows a timing diagram 400 for a HDD system (such as system 100 of FIG. 1). The timing diagram 400 includes timing signals for a "S Gate" 410, which is a servo gate timing signal, "SSMF" 412, which is a signal corresponding to a servo sync marker function, and a "B Gate" 414, which is a servo timing function corresponding to the PES field. Timing diagram 400 may include the timing signals for the entire disc, however, depicted in FIGS. 4A and 4B are timing signals for the normal servo wedge 401 and the timing signals for the short servo wedges 402 on the disc. The full servo wedge includes a preamble portion 404 and a PES field 406. As noted earlier, the short servo wedges typically only include the PES field information without additional preamble or SSM information. Accordingly, short servo wedge portion 402 includes PES field 406'.

During operation, in the full servo wedge, the B Gate 414 is typically triggered or turned on as a function of the servo sync marker or a certain value of the SSMF 412. In certain embodiments, the B Gate 414 may be turned on after a time period delay, represented by a parameter BG_DLY1 416. However, the short servo wedges, not having an SSM or a preamble, typically rely on the S Gate signal 410 for triggering. Thus, at the short servo wedge portion 402, B Gate signal 414 is triggered based on a calculation by the system 100 of a time delay from the S Gate 410 signal. In particular, the rise of the B Gate signal at 420 occurs an integer number of cycles from the rise of the S Gate signal at 418a.

The S Gate signal is generated by a system controller in the HDD and is typically not synchronous with the internal clock of the HDD system 100. This S Gate signal is susceptible to phase jitters. Without sophisticated clock control systems, clocks from two separate sources may not perfectly synchronize with each other. In particular, the read channel internal clock may have to be adjusted to compensate for disk frequency offset while the external clock source may not have to be adjusted as such. Therefore, the clock source used to generate the S Gate signal may be different from the read channel signal, consequently resulting in phase jitters. For full servo wedges, this is typically not an issue because other servo signals such as the B Gate signal 414 are not dependant on the S Gate signal itself. As noted earlier, the B Gate signal 414 in the full servo wedge depends on the firing of the the SSMF signal 412. However, frequency jitters in the S Gate signal 410 can significantly impact performance in short servo wedge portions of the disk. In the short servo wedge portion 402 shown in FIGS. 4A and 4B, the S Gate signal 410 is shifted slightly to the left (in FIG. 4A) 418a and to the right (in FIG. 4B) 418b due to the jitters. Because the B Gate signal 414 in the short servo wedge portion 402 is tied to the S gate signal, small shifts, right or left, of the S Gate can cause substantial phase shifts in the B Gate signal. As shown, the B Gate in FIG. 4B is shifted to the right of that in FIG. 4A by a delay 422. Such a delay can result in a change of sign of the PES burst, and consequently, a wrong radial position on the disc. The present disclosure substantially eliminates this problem.

Applicants have recognized that these problems can be avoided by tying the triggering of the B Gate signal of the short servo wedge portion directly to the sync marker in the full servo wedge. Such synchronization may be accurate because disc synchronization write (DSW) matches or syncs disk rotation to the internal clock. In particular, in such a synchronization, the timing of the B Gate in the first short servo wedge after a full servo wedge is calculated based on the servo sync marker (SSM). The processor may be configured to wait a delay 430 after the SSM to trigger the B Gate signal for the short server wedge. In certain embodiments, the location of the timing of the B Gate in the short servo wedge may be calculated based on the leading edge and/or lagging edge and/or a middle portion of the servo sync marker. Generally, the B Gate signal in the short servo wedge may be calculated based on any portion of the servo sync signal without departing from the scope of the present disclosure. In certain embodiments, the portion of the B Gate signal to which the delay from the SSM is calculated may include the leading edge of the B Gate signal and/or the lagging edge of the B Gate signal and/or a middle portion of the B Gate signal. Generally, any portion of the B Gate signal may be used when determining the length of the delay, without departing from the scope of the present disclosure.

Figure 5:
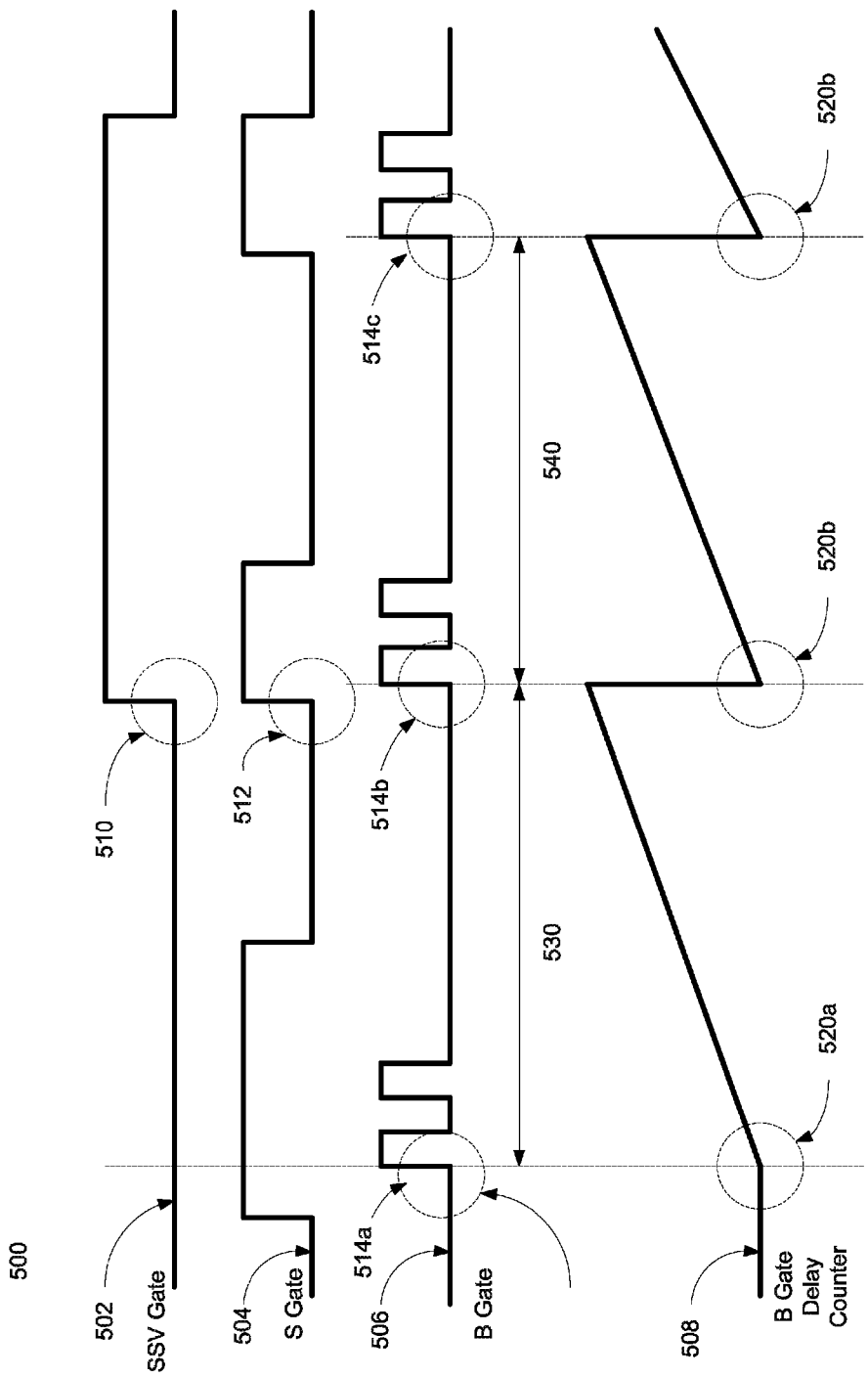
FIG. 5 illustrates a further synchronization protocol and synchronization parameters used by the HDD in accordance with an embodiment of the present disclosure.

B Gate signals for subsequent short server wedges may also be triggered indirectly from the SSM of the previous full server wedge. In certain embodiments, B Gate signals for subsequent short server wedges may be triggered based on B gate signals from previous short server wedges. On such implementation is shown in FIG. 5. In particular, FIG. 5 illustrates a further synchronization protocol and synchronization parameters used by the HDD in accordance with an embodiment of the present disclosure. Shown in FIG. 5 is a timing diagram 500 depicting the short servo gates (SSV) signal 502, S gate signal 504, and B gate signals 506 for a sequence of short servo wedges. As depicted in the timing diagram 500, the B Gate signal from a first short servo wedge 514a may be used to determine the triggering of B Gate signals 514b and 514c for subsequent short servo wedges. In one implementation, a parameter B Gate Delay Counter 508 may be defined which counts up each clock cycle starting at the first B Gate signal 514a (at 520a). After a pre-determined number of cycles have completed, corresponding to a time delay 530, the parameter B Gate delay counter may be reset at 520b and may resume counting until the next reset at 520b. In certain embodiments, the pre-determined maximum value of the counter before reset may be fixed between each of the short servo wedges on an HDD. In other embodiments, the pre-determined maximum value of the counter before reset may be variable and the time delay 540 may be different from time delay 530.

Figure 6:
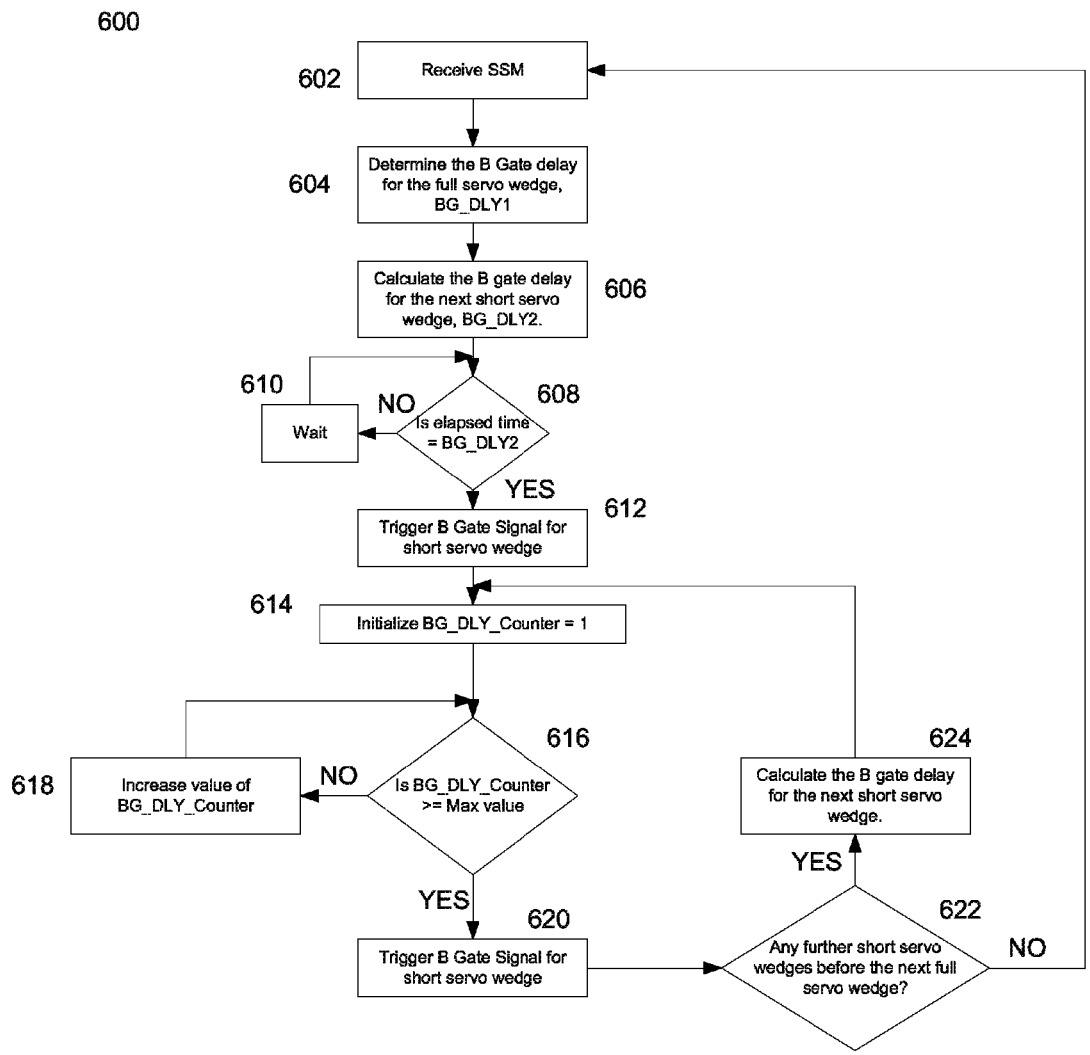
FIG. 6 is a flow diagram depicting a process for triggering short servo wedge gate signals in accordance with an embodiment of the present disclosure.

FIG. 6 is a flow diagram depicting a process for triggering short servo wedge gate signals. At 602, the process begins with the system 100 receiving a servo sync marker (SSM) in full servo wedge. At 604, the system 100 may determine and/or calculate the appropriate delay to triggering the PES gate signal (B Gate signal) in the full servo wedge. This delay may be stored in the system 100 as parameter BG_DLY1. At 606, the system 100 may also calculate the PES gate signal delay to the PES field in the short servo wedge. The delay may be stored as the same or a different parameter BG_DLY2. At 608 and 610, the system 100 in connection with the system clock determines if the BG_DLY1 or BG_DLY2 time has elapsed. At 612, the PES field signal for the short servo wedge (B Gate) is triggered by the processor. At 614, a counter parameter, BG_DLY_Counter, is initialized. At 616 and 618, the system 100 then checks if the counter has reached a threshold value (step 616 and 618). In certain embodiments, the threshold value may be predetermined. If the threshold is reached, then at 620, the system 100 triggers a PES gate signal (B Gate) for the next short servo wedge. At 622 and 624, the process may be repeated for subsequent short servo wedges, before the next full servo wedge. If there are no additional short servo wedges, the HDD system 100 returns to its search for an SSM from the next full servo edge.

It will be understood that the foregoing is only illustrative of the principles of this disclosure, and that various modifications can be made by those skilled in the art without departing from the scope or spirit of the disclosure. For example, both of the modifications shown in FIGS. 20 and 21 can be combined in one embodiment if desired. As another example, references herein to "first magnetic polarity" or the like can generally mean either "positive magnetic polarity" or "negative magnetic polarity." Whichever one of "positive" or "negative" is chosen for the "first magnetic polarity," then the other one of "positive" or "negative" will be the "second magnetic polarity" or the like.

What is claimed is:

1. A method of controlling synchronization of a servo clock for reading servo information from a disk that is rotating relative to a read head, the method comprising:
   determining a location of a servo synchronization marker on a full null servo wedge;
   estimating a gate delay corresponding to a position error signal (PES) field in a short null servo wedge based, at least in part, on the location of the servo synchronization marker;
   producing a servo clock timing control signal based on the estimated gate delay; and
   applying the servo clock timing control signal to the servo clock.

2. The method of claim. 1, wherein the gate delay is a first gate delay, and further comprising estimating a second gate delay corresponding to a PES field in an additional short null servo wedge based, at least in part, on the estimated first gate delay, and producing the servo clock timing control signal based on the estimated first gate delay and the estimated second gate delay.

3. The method of claim 2, wherein estimating the second gate delay includes determining a number of system clock cycles between the short null servo wedge and the additional short null servo wedge.

4. The method of claim 1, further comprising estimating the gate signal corresponding to the PES field based, at least in part, on at least one of a servo gate signal, a leading edge of the servo synchronization marker, a trailing edge of the servo synchronization marker, and a middle portion of the servo synchronization marker.

5. The method of claim 1, wherein estimating the gate signal includes estimating at least one of a leading edge of the first gate signal, a trailing edge of the first gate signal, and a middle portion of the first gate signal.

6. The method of claim 1, wherein the PES field of the short servo wedge and servo synchronization marker of the full servo wedge are formed on the same track.

7. The method of claim 1, wherein estimating the gate delay corresponding to the PES field in the short null servo wedge includes determining a time period delay from the servo synchronization marker.

8. The method of claim 1, wherein estimating the gate delay corresponding to the PES field in the short null servo wedge includes determining an integer number of cycles from the servo synchronization marker.

9. The method of claim. 8, wherein the integer number of cycles includes a predetermined number of cycles.

10. The method of claim 8, wherein the integer number of cycles includes a variable number of cycles.

11. Synchronization circuitry comprising:
    circuitry for:
      determining a location of a servo synchronization marker on a full null servo wedge, and
      estimating a first gate delay corresponding to a position error signal (PES) field in a short null servo wedge based, at least in part, on a location of the servo synchronization marker; and
    servo timing circuitry coupled to the processor and configured for:
      producing a servo clock timing control signal based on an estimated gate delay; and
      applying the servo clock timing control signal to a servo clock.

12. The synchronization circuitry of claim 11, wherein the gate delay is a first gate delay, and wherein the processor is configured with circuitry for estimating a second gate delay corresponding to a PES field in an additional short null servo wedge based, at least in part, on the estimated first gate delay, and wherein the servo timing circuitry is configured for producing the servo clock timing control signal based on the estimated first gate delay and the estimated second gate delay.

13. The synchronization circuitry of claim 12, wherein the processor is configured with circuitry for estimating the second gate delay by determining a number of system clock cycles between the short null servo wedge and the additional short null servo wedge.

14. The synchronization circuitry of claim 11, wherein the circuitry for estimating the first gate signal corresponding to the PES field is based, at least in part, on at least one of a servo gate signal, leading edge of the servo synchronization marker, a trailing edge of the servo synchronization marker, and a middle portion of the servo synchronization marker.

15. The synchronization. circuitry of claim 11, wherein the circuitry for estimating the first gate signal estimates at least one of a leading edge of the first gate signal, a trailing edge of the first gate signal, and a middle portion of the first gate signal.

16. The synchronization circuitry of claim 11, wherein the PES field of the short servo wedge and servo synchronization marker of the full servo wedge are formed on the same track.

17. The synchronization circuitry of claim 11, wherein the circuitry estimates the gate delay corresponding to the PES field in the short null servo wedge by determining a time period delay from the servo synchronization marker.

18. The synchronization circuitry of claim 11, wherein the circuitry estimates the gate delay corresponding to the PES field in the short null servo wedge by determining an integer number of cycles from the servo synchronization marker.

19. The synchronization circuitry of claim 17, wherein the integer number of cycles includes a predetermined number of cycles.

20. The synchronization circuitry of claim 17, wherein the integer number of cycles includes a variable number of cycles.

* * * * *